(12) United States Patent
Piipponen et al.

(10) Patent No.: US 8,046,184 B2
(45) Date of Patent: Oct. 25, 2011

(54) CALIBRATION METHOD AND CALIBRATION MANAGER

(75) Inventors: Antti Piipponen, Tampere (FI); Aarno Parssinen, Espoo (FI); Konsta Sievanen, Jyvaskyla (FI)

(73) Assignee: Nokia Corporation, Espoo (FI)

( * ) Notice: Subject to any disclaimer, the term of this patent is extended or adjusted under 35 U.S.C. 154(b) by 793 days.

(21) Appl. No.: 11/978,714

(22) Filed: Oct. 30, 2007

(65) Prior Publication Data

US 2008/0294362 A1 Nov. 27, 2008

(30) Foreign Application Priority Data

May 22, 2007 (GB) .................................. 0709812.2

(51) Int. Cl.
*G01D 18/00* (2006.01)
(52) U.S. Cl. ........................................................ 702/85
(58) Field of Classification Search .................... 702/85, 702/89, 99, 106, 107; 455/67.13; 710/58, 710/60
See application file for complete search history.

(56) References Cited

U.S. PATENT DOCUMENTS

| | | | |
|---|---|---|---|
| 4,885,715 A | 12/1989 | McCanny et al. | |
| 5,459,816 A | 10/1995 | Basehore et al. | |
| 5,649,303 A | 7/1997 | Hess et al. | |
| 6,006,106 A | 12/1999 | Cook et al. | |
| 6,138,010 A * | 10/2000 | Rabe et al. | 455/426.1 |
| 6,281,818 B1 * | 8/2001 | Miller | 341/120 |
| 6,741,639 B1 | 5/2004 | Yoshida et al. | |
| 6,816,476 B2 | 11/2004 | Kim et al. | |
| 6,836,506 B2 | 12/2004 | Anderson | |
| 6,978,121 B1 | 12/2005 | Lane et al. | |
| 7,016,668 B2 | 3/2006 | Vaidyanathan et al. | |
| 7,373,156 B2 | 5/2008 | Ruutu et al. | |
| 7,447,179 B2 | 11/2008 | Lu | |
| 2002/0012381 A1 | 1/2002 | Mattisson et al. | |
| 2002/0098864 A1 | 7/2002 | Mukai et al. | |
| 2002/0176524 A1 | 11/2002 | Popper et al. | |
| 2003/0078037 A1 | 4/2003 | Auckland et al. | |
| 2003/0125019 A1 | 7/2003 | Bajikar | |
| 2003/0169827 A1 | 9/2003 | Shi et al. | |
| 2004/0018818 A1 | 1/2004 | Hottinen et al. | |
| 2004/0023678 A1 | 2/2004 | Fredriksson | |
| 2004/0042576 A1 | 3/2004 | Anderson | |
| 2004/0185899 A1 | 9/2004 | Hayem et al. | |
| 2004/0225461 A1 | 11/2004 | Floyd et al. | |
| 2004/0243331 A1 * | 12/2004 | Davis et al. | 702/85 |

(Continued)

FOREIGN PATENT DOCUMENTS

EP     0941002 A2     9/1996

(Continued)

OTHER PUBLICATIONS

Jim Lansford, et al., "Wi-Fi (802.11b) and Bluetooth: Enabling Coexistence," IEEE Network, Sep./Oct. 2001, pp. 20-27.

(Continued)

*Primary Examiner* — Manuel L Barbee
(74) *Attorney, Agent, or Firm* — Squire, Sanders & Dempsey (US) LLP

(57) ABSTRACT

A calibration manager comprises means for receiving information relating to the calibration of at least one component. Means for setting a trigger condition for executing a calibration in dependence on said received information is provided. Means are provided for executing said calibration in dependence on said trigger condition.

27 Claims, 6 Drawing Sheets

| U.S. PATENT DOCUMENTS | | |
|---|---|---|
| 2005/0020299 A1 | 1/2005 | Malone et al. |
| 2005/0095982 A1 | 5/2005 | Blanchard et al. |
| 2005/0131636 A1 | 6/2005 | Derambure et al. |
| 2005/0152322 A1 | 7/2005 | Dolwin et al. |
| 2005/0201355 A1 | 9/2005 | Saito |
| 2005/0239497 A1 | 10/2005 | Bahl et al. |
| 2006/0084469 A1 | 4/2006 | Malone et al. |
| 2006/0221926 A1 | 10/2006 | Maekawa et al. |
| 2006/0238418 A1 | 10/2006 | Monnerat et al. |
| 2007/0165594 A1 | 7/2007 | Heinle et al. |
| 2008/0112517 A1 | 5/2008 | Parts et al. |
| 2008/0267160 A1 | 10/2008 | Ibrahim et al. |
| 2008/0293445 A1 | 11/2008 | Piippponen et al. |

| FOREIGN PATENT DOCUMENTS | | |
|---|---|---|
| EP | 1389855 A2 | 2/2004 |
| GB | 2402843 A | 12/2004 |
| GB | 2407178 A | 4/2005 |
| WO | 2006096864 A2 | 9/2006 |
| WO | 2007060494 A1 | 5/2007 |

OTHER PUBLICATIONS

International Search Report; Issued on International Application No. PCT/EP2008/056341, Dated Sep. 26, 2008.
U.S. Non-Final Office Action, U.S. Appl. No. 11/892,378, Notification Date: Apr. 4, 2011, pp. 1-25.

* cited by examiner

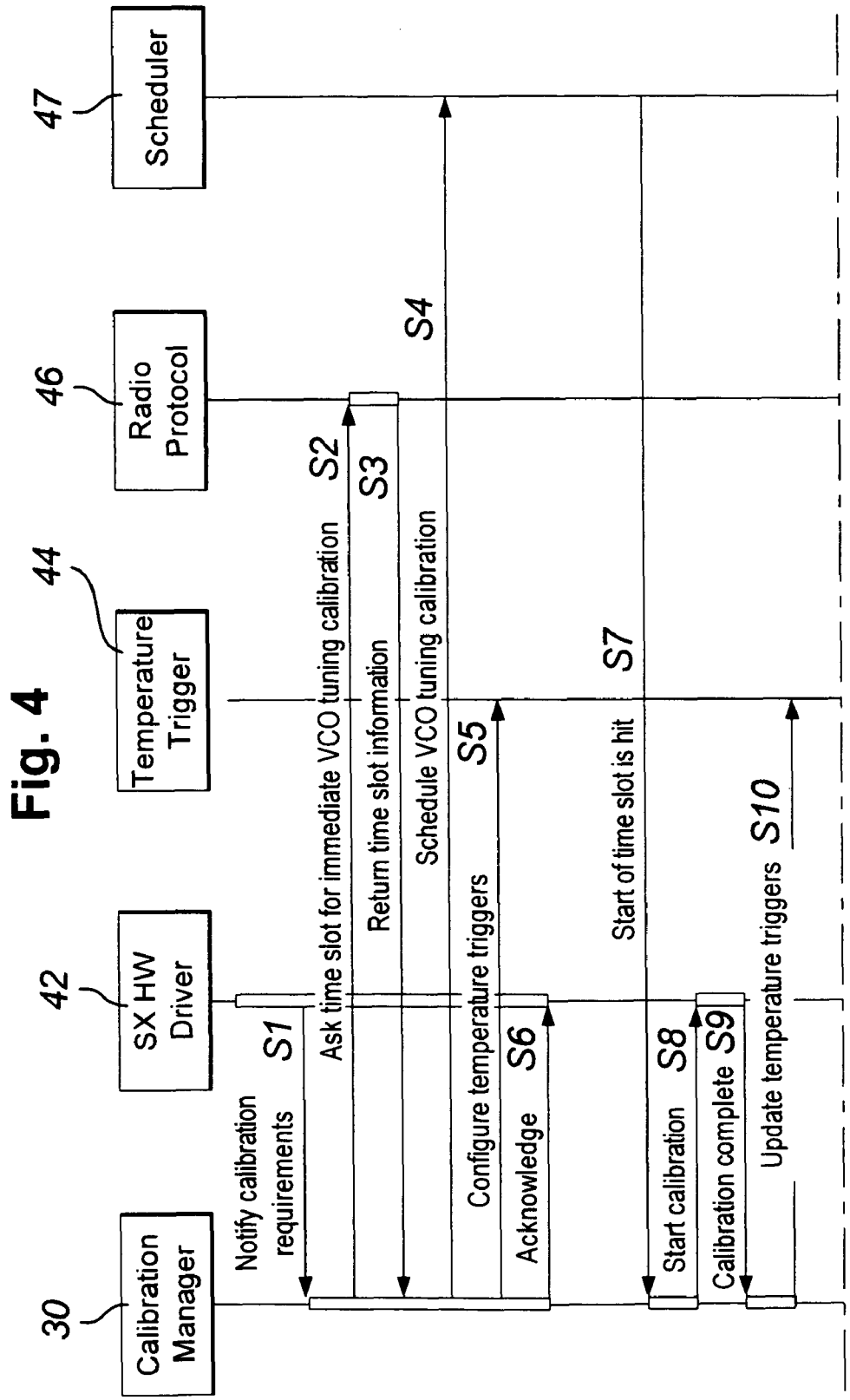

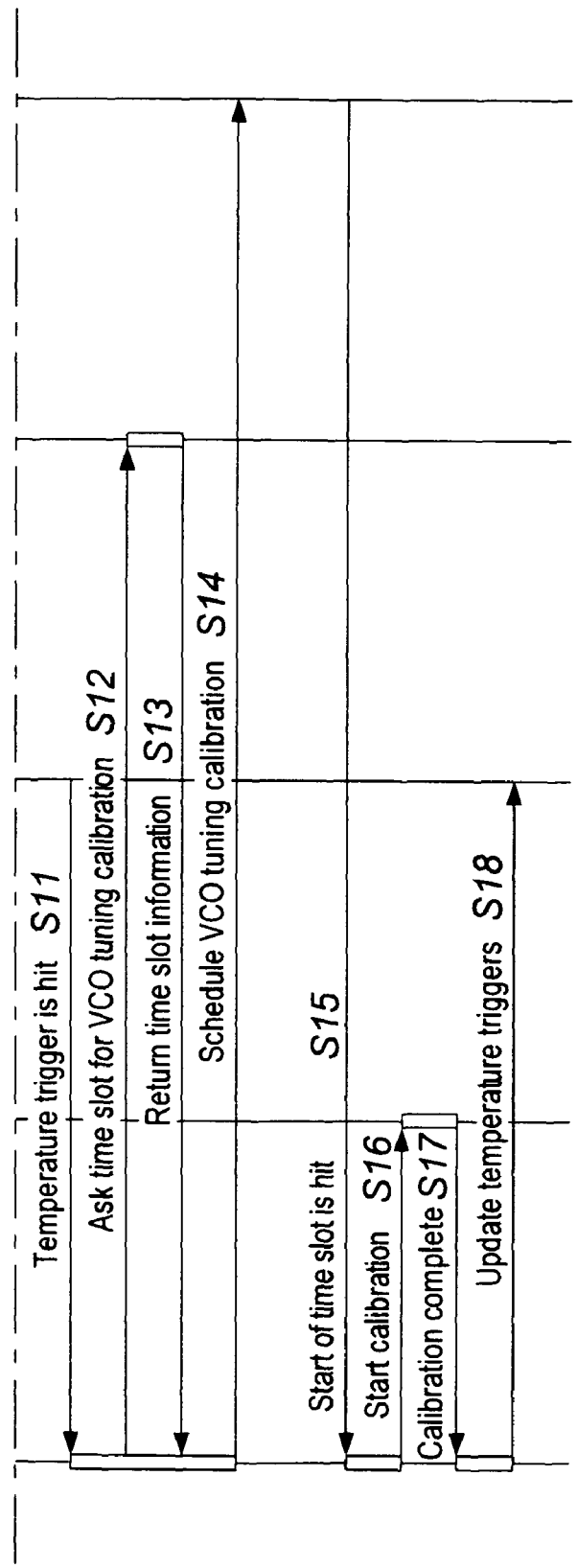
Fig. 4 (contd.)

CALIBRATION METHOD AND CALIBRATION MANAGER

FIELD OF THE INVENTION

The present invention relates to a calibration method and a calibration manager.

BACKGROUND

The communication device can be understood as a device provided with appropriate communication and control capabilities for enabling use thereof for communication with other parties. The communication may comprise, for example, communication of voice, electronic mail (email), text messages, data, multimedia and so on. A communication device typically enables a user of the device to receive and transmit communications via a communications system and can thus be used for accessing various applications.

A communication system is a facility which facilitates the communication between two or more entities such as the communication devices, network entities and other nodes. An appropriate access system allows the communication device to access the communication system. An access to the communication system may be provided by means of a fixed line or wireless communication interface, or a combination of these.

Communication systems providing wireless access typically enable at least some mobility for the users thereof. Examples of these include cellular wireless communications systems where the access is provided by means of access entities called cells. Other examples of wireless access technologies include Wireless Local Area Networks (WLANs) and satellite based communication systems.

Generally, a communication device will incorporate one or more Integrated Circuits (IC). Integrated circuit process variations can cause the analog components of an integrated circuit to have different properties from chip to chip. Environmental conditions, such as temperature, operating voltages and aging, can also change the analog component properties. Additionally, some transceiver architectures may suffer from degraded performance that requires periodic compensation. An example of this is the direct conversion receiver DC (Direct Current) offset cancellation between bursts in a TDMA (Time Division Multiple Access) system. Radio Frequency (RF) designers need to take into account these process variations, environmental conditions and other degradation in performance. Accordingly, designs which have been proposed generally include calibration or compensation circuitry. For example, switchable capacitor matrices, adjustable biasing currents or the like may be provided.

The inventors have appreciated that the calibration required can be divided roughly into five different categories:
1. Foundry—ASIC (application specific integrated circuit)/module fabrication—calibrations required to compensate the integrated circuit itself.
2. Factory (communication device fabrication)—that is when the communication device incorporating the IC is manufactured.
3. Communication device start-up, for example when the communication device is used for the first time or switched on.
4. On-line—(idle mode), that is when the communication device is turned on but not actually being used.
5. Environmental—where the communication device is in an active mode, that is switched on and being used.

It is known to provide "one time" calibrations during fabrication of the communication device during testing. To facilitate this, radio frequency designers have provided custom logic to facilitate specific calibrations.

However, the inventors have appreciated that providing different calibration logic to deal with each different type of calibration makes it difficult to reuse the logic in different designs as it is much customized. Additionally, the customised logic for each of the different types of calibration takes up space on the IC area, which is undesirable.

The problem mentioned above is exacerbated when the communication device is provided with so called multi-radio capabilities. That is, the same communications device may be used for communication via a plurality of different wireless interfaces. Managing the calibration of multi-radio transceivers is complex since the same radio frequency hardware can be configured for a number of different radio systems.

It is an aim of one or more embodiments of the invention to address or at least mitigate one or more of the problems set out above.

SUMMARY OF THE INVENTION

According to an aspect of the invention, there is provided a calibration method comprising; receiving information relating to the calibration of at least one component; setting a trigger condition for a calibration measurement in dependence on said received information; and executing said calibration in dependence on said trigger condition.

According to another aspect of the invention there is provided a calibration manager, comprising; means for receiving information relating to the calibration of at least one component; means for setting a trigger condition for executing a calibration in dependence on said received information; and means for executing said calibration in dependence on said trigger condition.

A calibration manager, comprising; means for receiving information relating to the calibration of at least one component; means for setting a trigger condition for a calibration measurement, said trigger condition being at least one of: time, regular time intervals; temperature, an environmental condition; operating conditions, change in system parameters; before or after a transmission or reception of a signal; configuration changes of at least one component; initialization of a new component; a predetermined power level; configuration of at least one component for a different radio protocol.

A system comprising: a calibration manager implemented in software; at least one hardware; at least one hardware driver for said hardware, said at least one hardware driver being arranged to provide calibration information to said calibration manager, said calibration manager being configured to control the calibration of said at least one hardware.

BRIEF DESCRIPTION OF THE FIGURES

For a better understanding of the present invention and as to how it may be carried into effect, reference will now be made by way of example only to the accompanying figures in which:

FIG. 4 shows an example of a signal flow in a communications device embody the invention;

DETAILED DESCRIPTION OF EMBODIMENTS OF THE INVENTION

Before explaining in detail certain exemplifying embodiments, certain general principles of wireless communication devices are briefly explained with reference to FIG. 5. A portable communication device can be used for accessing various services and/or applications via a wireless or radio interface. A portable wireless device can typically communicate wirelessly via at least one base station or similar wireless transmitter and/or receiver node or directly with another communication device. A portable communications device may have one or more radio channels at the same time and may have communication connections with more than one other party. A portable communication device may be provided by any device capable of at least one of sending or receiving radio signals. Non limiting examples include a Mobile Station (MS), a portable computer provided with a wireless interface card or other wireless interface facility, Personal Data Assistant (PDA) provided with wireless communication capabilities, or any combinations of these or the like.

Figure 5:
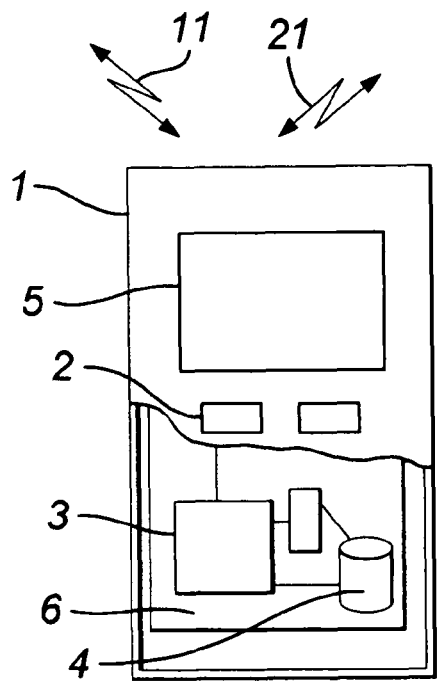
FIG. 5 shows schematically a wireless communication device with which embodiments of the present invention can be used.

FIG. 5 shows a schematic partially sectioned view of a portable communications device 1 that can be used for communication via at least one wireless interface. The electronic device 1 of FIG. 5 can be used for various tasks such as making and receiving telephone calls, for receiving and/or sending data from and to a data network and for experiencing, for example, multimedia or other content. The device 1 may also communicate over short range radio links such as Bluetooth™ link. The device may communicate via an appropriate radio interface arrangement of the mobile device.

A portable communication device is typically also provided with at least one data processing entity 3 and at least one memory for use in tasks it is designed to perform. The data processing and storage entities can be provided on an appropriate circuit board and/or in integrated circuits. This feature is denoted by reference 6. The user may control the operation of the device 1 by means of a suitable user interface such as keypad 2, voice commands, touch sensitive screen or pad, combinations thereof or the like. A display 5, a speaker and a microphone are also typically provided. Furthermore, a wireless portable device may comprise appropriate connectors (either wired or wireless) to other devices and/or for connecting external accessories, for example hands-free equipment thereto.

The device may also be enabled to communicate on a number of different system and frequency bands. This capability is illustrated in FIG. 5 by the two wireless signals 11 and 21.

Embodiments of the present invention relate to Software Defined Radio (SDR), methods in embedded control software and accompanying hardware to control radio applications such as a multi-radio device in a portable communication device or any other suitable communication device which may or may not be portable or movable.

Some embodiments of the present invention provide a method to manage calibration of various RF components in a centralised manner.

Embodiments of the present invention can be applied to the control of individual radio systems/protocols such as GSM (Global System for Mobile Communications), WCDMA (Wideband Code Division Multiple Access), WLAN (Wireless Local Area Network), BT (Bluetooth), DVB-H (Digital Broadcasting—Handheld devices), WiMax (Worldwide Interoperability for Microwave Access), GPS (Global Positioning System), Gallela, or any of their extensions such as HSDPA (High-Speed Downlink Packet Access), HSUPA (High-Speed Uplink Packet Access) and LTE (Long-term evolution) in the case of 3GPP/UMTS (Third Generation Partnership Project/Universal Mobile Telecommunications System). Thus, a device may support a single radio system/protocol. Alternative embodiments of the present invention may be used when more than one of the individual protocols is operated in a single device i.e. a so called multi-radio environment.

Some embodiments of the present invention centralise the management of calibrations and/or tuning in a single software component that collects all the calibrations needed from the hardware drivers, handles the timing of the calibrations, configures the triggers (e.g. temperature thresholds or timers) for the calibrations and initiates a calibration routine as required. It should be appreciated that in some inventions all of the calibrations are centralised into a single software component. However, alternative embodiments of the present invention may provide a software component that addresses two or more calibration requirements. The calibration manager may not deal with all of the calibration needs but only some thereof.

Figure 1:
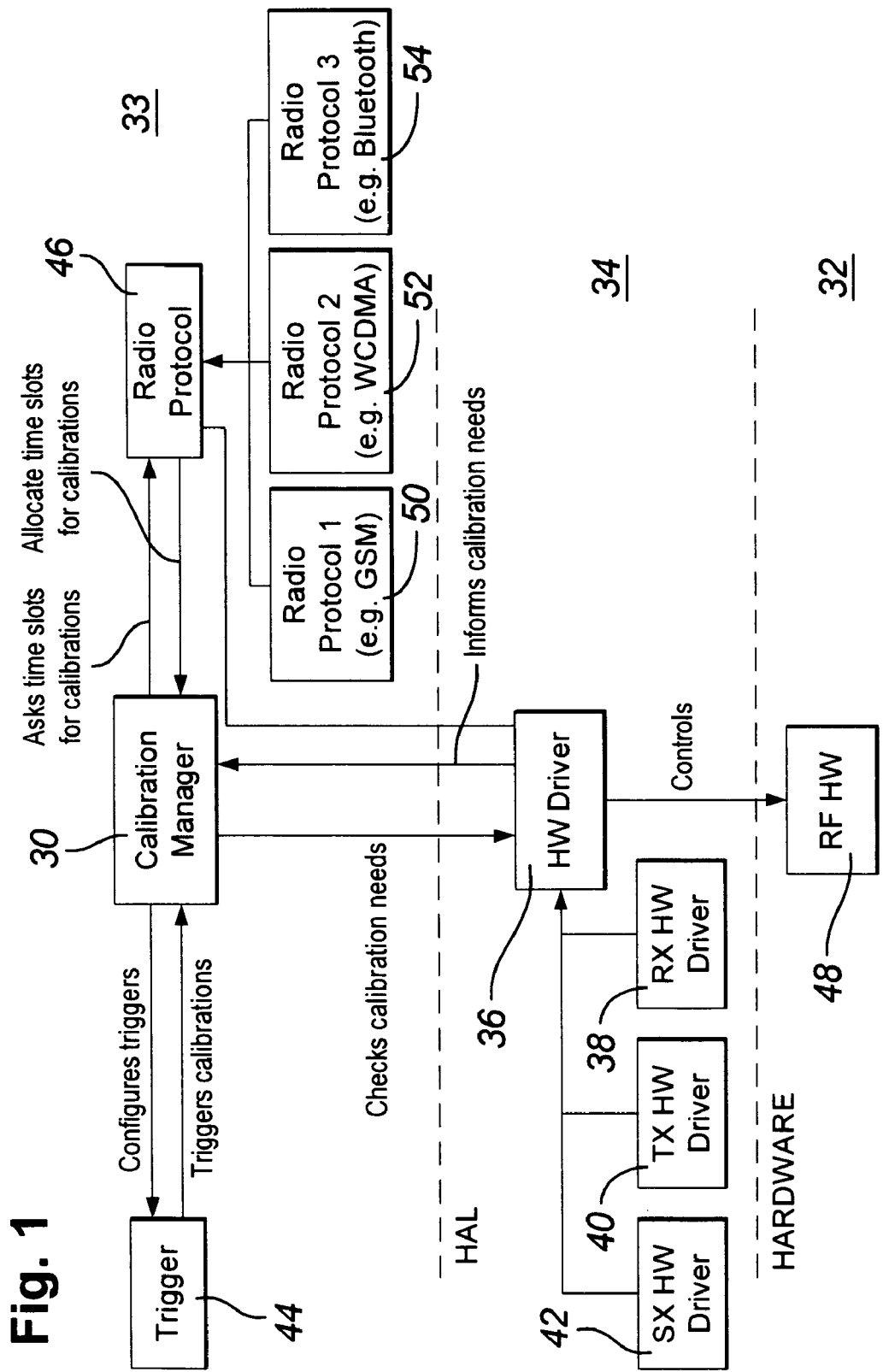
FIG. 1 shows schematically a first embodiment of the present invention.

Reference is now made to FIG. 1 in which a schematic embodiment of a present invention is shown. UML (Unified Modelling Language) notation is used. It should be appreciated that in some embodiments there may be additional elements or blocks present. Additionally there may be additional connections between the illustrated elements.

The device embodiment in the present invention has three parts. The first part is the hardware part 32 which comprises the RF hardware 48.

The second part 34 is the HAL (Hardware Abstraction Layer) part. This is the abstraction layer which is implemented in software between the physical hardware of the layer 32 and the software of the software part 33. The HAL part 34 comprises a hardware driver 36. As represented diagrammatically in FIG. 1, the hardware driver 36 comprises a frequency synthesizer SX hardware driver 42, a transmit TX hardware driver 40 and a receive hardware driver 38. The hardware driver 36 controls the RF hardware 48.

The third part 33 is the software part and comprises a calibration manager 30. The calibration manager 30 is connected to a trigger 44. The calibration manager 30 is arranged to configure the trigger 44. For example, the trigger 44 may be triggered by a temperature change, the expiry of a predetermined amount of time, a block mode or the like. In response to the occurrence of the triggering event, the trigger 44 is arranged to trigger the calibration procedure by the calibration manager 30.

The calibration manager 30 is also connected to a radio protocol block 46. As shown schematically, the radio protocol block 46 is effectively made up of a number of radio protocol blocks, the number of which is dependent on the number of radio protocols supported. As far as the calibration manager is concerned the radio protocol blocks all look like the same generalised radio protocol so that the calibration manager does not need to know about the implementation of the individual radio protocol blocks. In the example shown in FIG. 1, three radio protocols are supported. By way of example, the first radio protocol block 50 is in respect of GSM, the second radio protocol block 52 is in respect of WCDMA whilst the third radio protocol block 54 is in respect of Bluetooth. It should be appreciated that this is by way of example. Some embodiments of the present invention will have a single protocol whilst other embodiments will have a two radio protocol blocks or more. The Radio protocol block 50 is also connected to the hardware driver to allow the radio protocol block access to one or more of the hardware.

Figure 6:
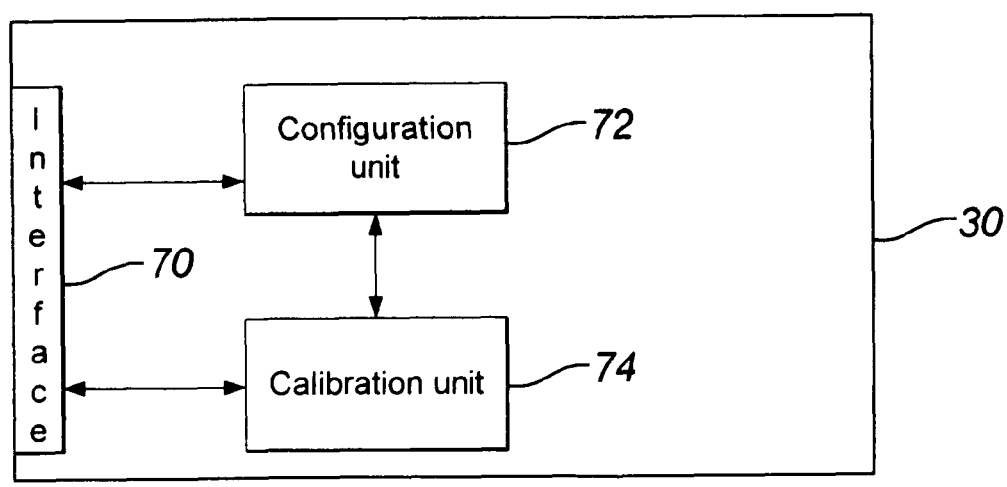
FIG. 6 schematically shows a calibration manager embodying the present invention.

It should be appreciated that the blocks shown in the software part 33 are representations of the function provided by that software part. The functionality of the calibration manager is illustrated in FIG. 6. It should be appreciated that this is an example and a single or different functionality may provide the calibration manager.

The calibration manager 30 is arranged to communicate with the hardware driver 36 via an interface 70 of the calibration manager. The calibration unit 74 of the calibration manager 30 is arranged to check the calibration needs with the hardware driver 36. The hardware driver 36 advises the calibration unit 74 of the calibration manager 30 of the calibration requirements. The calibration needs lead to the configuring of the triggers by the configuration unit 72, the latching of which leads to the activation of the calibration routines by the calibration unit 74.

The calibration unit of calibration manager 30 is arranged to check from the radio protocol when there is a free time slot available for a required calibration. This is for certain types of calibration, the so called on-line calibration which uses idle slots. The radio protocol block 46 allocates time slots for calibrations to the calibration manager. For calibrations run at system start-up time, the calibration manager does not need to request time slots. Communication with the entities external to the calibration manager, by the calibration manager, will be via the interface 70.

Figure 2:
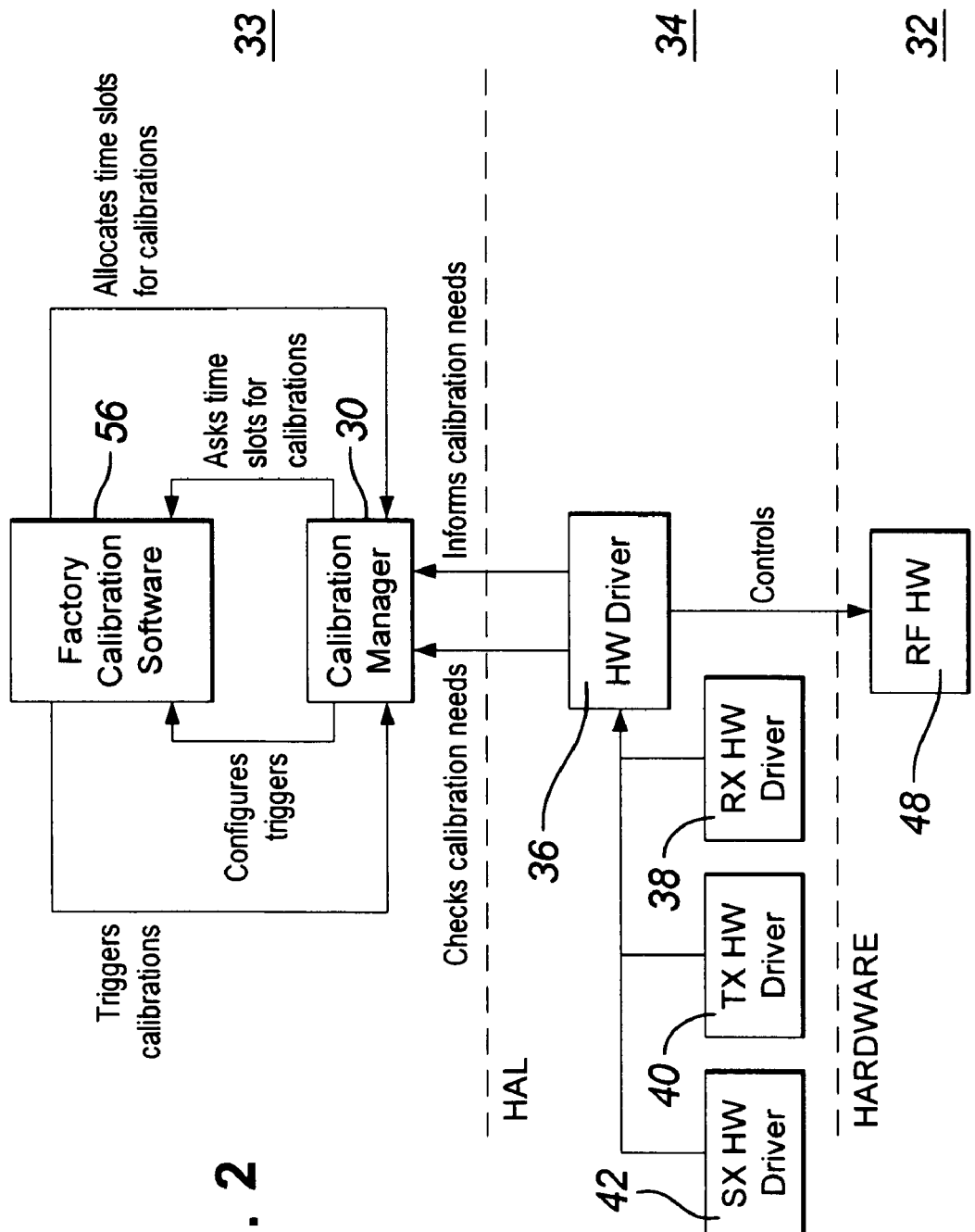
FIG. 2 shows a further embodiment of the present invention.

Reference is made to FIG. 2 which shows a modification to the embodiment shown in FIG. 1. In practice, the modification shown in FIG. 2 may, in some embodiments, be used in conjunction with the arrangement of FIG. 1. In particular, the software part 33 comprises factory calibration software 56. This shows an arrangement which can be used in a factory environment. The factory calibration software 56 handles calibration triggers and timing. The calibration manager 30 is arranged to configure triggers for the factory calibration software and to request from the factory calibration software timeslots for the calibration. The factory calibration software is arranged to trigger the calibration. This is independent on the configured trigger. Likewise, the factory calibration software 56 is able to allocate timeslots for the calibrations.

Figure 3:
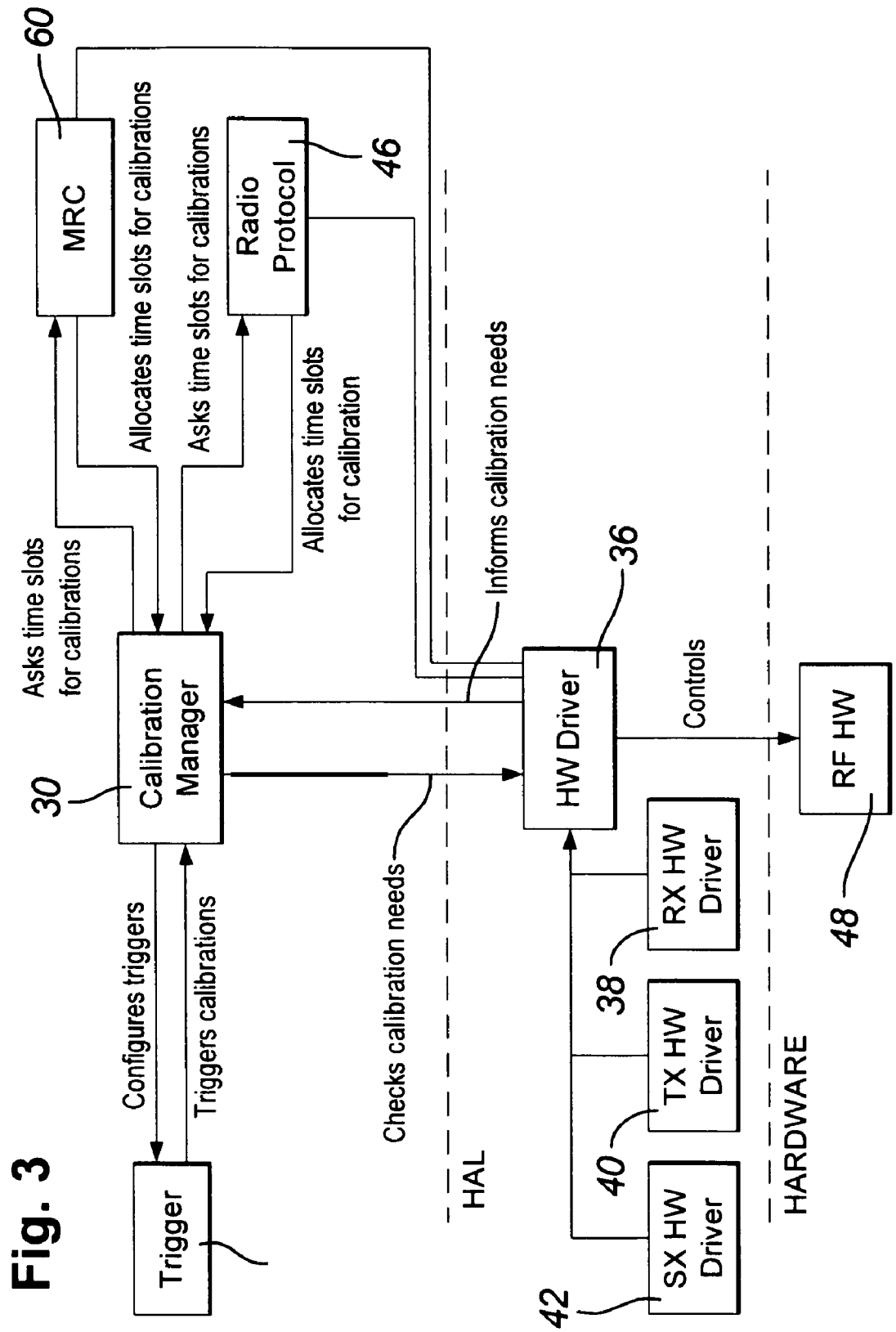
FIG. 3 shows yet another embodiment of the present invention.

Reference is made to FIG. 3 which shows a modification to the arrangement of FIG. 1. In the modification shown in FIG. 3, the timing information can be requested from a multi-radio controller MRC 60 or from a radio protocol block 46. The calibration manager can therefore check from the MRC 60 or the radio protocol when there is a free timeslot available for the required calibration. It should be appreciated that in some embodiments of the present invention, the radio protocol block 46 can be omitted with the MRC block doing all the slot allocation.

Reference is now made to FIG. 4 which gives an example of the commands and signals used in a VCO (voltage controlled oscillator tuning calibration).

In step S1, the frequency synthesizer hardware driver 42 notifies the calibration manager 30 of the calibration requirements.

In step S2, the calibration manager 30 asks for a timeslot for immediate VCO tuning calibration. This request is made to the radio protocol block 46.

The radio protocol block 46 replies in step S3 with timeslot information.

In step S4, the calibration manager 30 schedules the VCO tuning calibration with a timer 47

In step S5, the calibration manager 30 configures the temperatures triggers and sends them to the temperature trigger 44. It should be appreciated that step S6 can take place before or after or at the same time as steps 3, 4 and 5. Once this has been completed, the calibration manager 30 sends an acknowledgement message to the frequency synthesizer hardware driver 42 in step S6.

In step S7, the timer 47 advises the calibration manager 30 that the start of the time slot has come. The calibration manager 30 instructs the SX hardware driver 42 to start the calibration in step S8. When the calibration is complete, the SX hardware driver 42 sends a message in step S9 to the calibration manger 30. The calibration manager 30 updates the temperature triggers and sends a message in step S10 to the temperature trigger with the updated temperature trigger information. In step S11, the temperature trigger 44 sends a message to the calibration manager 30 that a temperature trigger has been hit.

It should be appreciated that steps S12, S13, S14, S15, S16, S17 and S18 correspond to steps S2, S3, S4, S7, S8, S9 and S10 respectively. The whole process is then repeated from steps S11 to S17.

Some embodiments of the present invention are thus able to set up the calibrations so that the transceiver is operating at the correct operation points. Embodiments of the present invention can be used both in single system transceivers as well as more complicated multi-radio transceivers which have many more calibration points that have to be managed. Embodiments of the present invention can be used to achieve "on-line" or "idle mode" calibrations. Embodiments of the present invention allow for "on-line" calibrations which may be of relevance to multi-radio environments where the same RF hardware can be configured for more than one different radio system.

Furthermore, embodiments of the present invention are able to address new integrated circuit processes which may have higher variation, thus requiring additional calibration.

Some embodiments of the present invention may thus provide calibration methods using a software control. Embodiments for the present invention are such that new "on-line calibrations" can be added relatively easily to the software. Thus, in contrast with previous proposals, a hardware block with run time calibration requirements can be relatively easily accommodated. Prior approaches have suggested doing the calibrations as far as possible in the manufacturing phase. However, this approach does increase manufacturing costs and slows down basic design time because the structures need to be designed with maximum robustness against any variations to avoid additional calibration. In contrast, some embodiments of the present invention mean that it is possible to add calibrations to the RF control software, share many of the common routines such as scheduling that are related to the different calibrations, defined access to on-line calibrations during idle modes and/or provide a proper interface to the hardware drivers that contain the information of the specific calibration teams.

As proposed in the embodiment shown in FIG. 2, the calibration manager may not do all of the calibration management. For example, there are some types of calibration which might require sufficient reference signals to perform calibrations with the required accuracy. This can be achieved using the factory calibration software. Such calibrations may need to be done during the manufacturing phase. Embodiments of the present invention may mean that in some cases, the number of calibrations that are required during manufacture can be minimised.

It should be appreciated that the actual calibration routines are developed as part of the hardware driver. The hardware driver is arranged to communicate basic information such as the duration, conditions when the calibration is required, the hardware resources required for the calibration or the like to the calibration manager. In this way, the calibration manager is able to schedule and initiate the calibrations as required by the particular hardware.

The calibration manager embodying the present invention may be used in the ASIC may be used in any one or more of the five calibration categories mentioned previously. In embodiments of the present invention, the appropriate calibration information may be included in the hardware drivers. The integrated circuit requires the appropriate measurement equipment and a proper way to save the calibration results may be provided.

In embodiments of the present invention, the calibration manager 30 reads or receives specific calibration requirements from a hardware driver. The calibration manager controls the configuration of the various triggers for the calibration procedures and these triggers are used to wake up the calibration routines. The calibrations are then carried out. In preferred embodiments of the present invention, these calibrations can be carried out in idle slots.

Different calibrations may be triggered differently. The same calibration may, in some embodiments be triggered by different events. The type of event and/or the threshold used to trigger an event may vary over time.

The following examples are given as possible cases for calibration:
1. Each time before reception and/or transmission.
2. A fixed number of times within a fixed period, for example once in a minute or once in a day or twice in a minute or twice in a day.
3. Whenever conditions in the environment change, for example the temperature sensor triggers the calibration because of a change in temperature.
4. Whenever the hardware configuration changes or a new system is initialised.
5. Whenever system parameters all fall below certain limits. These may be thresholds. Examples of this include output power in the transmission.

As can be appreciated, the examples set out above do not have the same timing requirements or triggering conditions. However, other routines such as how the calibration itself is performed in general may be similar and may depend on the implementation.

In the example of case 1, the time needed for the calibration routine needs to be reserved after the device activation that needs to be completed just before the actual function of the device to optimise overall performance such as, for example, minimisation of the power consumption. In the case of the fourth and fifth examples, the calibrations need to be done before the actual operation but the scheduling has some more flexibility. In the case of examples 2 and 3 there is more flexibility because the changes in the parameter value are slow compared to the radio protocol schedules and therefore allow very flexible scheduling.

In embodiments of the present invention, the calibration manager can take care of the scheduling of tasks in one or more of the abovementioned examples.

In the example described, the calibration manager ask the hardware drivers for the different blocks of their calibration needs and that information is returned to the calibration manager. In an alternative embodiment, the hardware drivers may notify the calibration manager automatically of their calibration requirements during an initialisation procedure. Other ways may be provided for ensuring that the calibration manager has the information as to various calibration requirements.

In some embodiments of the present invention, the same hardware blocks and drivers may be used for more than one different radio system. Accordingly, in one modification to the above described embodiments, the drivers inform the calibration manager only of those calibrations that are required for the system that the drivers are initialised for. The calibration manager can then set the trigger for the required calibrations and when a trigger indicates that a calibration is required, the calibration manager controls the finding of a suitable timeslot for that calibration and executes a calibration in the timeslot.

The results of the calibration can take any suitable form. For example, the calibrations may comprise offsets to be added to the nominal values. For example, the actual gain provided may be some nominal value plus the calibration offset. Alternatively, the results of the calibration may be polynomial coefficients which can be used in calculations, for example when calculating the correct control word for a VCO.

When the calibration is completed, the calibration results may be saved into memory and the hardware drivers may use the saved calibration results to set the calibrator block to the required operating point.

It should be appreciated that whilst embodiments of the invention have been described in relation to devices such as mobile terminals, embodiments of the invention are applicable to any other suitable type of device suitable for communication via a communications network.

In alternative embodiments of the invention, the invention may be applied to a base station or the like.

It should be appreciated that embodiments of the invention may be implemented by a computer program. The computer program may be provided with one or more computer executable components for carrying out one or more steps. The computer program may be provided by a computer carrying media.

Some embodiments of the invention may have wider application other than for the calibration of RF components but may be used in any arrangement where calibration of a plurality of elements is required.

Although the present invention has been described with reference to examples and the accompanying drawings, it is clear that the invention should not be regarded as being restricted thereto but can be modified in several ways within the scope of the claims.

The invention claimed is:

1. An apparatus, comprising:
   at least one processor; and
   at least one memory including computer program code,
   wherein the at least one memory and the computer program code are configured to, with the at least one processor, cause the apparatus at least to:
   receive information relating to a calibration of at least one component from the at least one component,
   set a trigger condition for executing said calibration based on said received information, and
   execute said calibration based on said trigger condition.

2. The apparatus as claimed in claim 1, wherein the at least one memory and the computer program code are configured to, with the at least one processor, cause the apparatus at least to set a time for said calibration.

3. The apparatus as claimed in claim 2, wherein the at least one memory and the computer program code are configured to, with the at least one processor, cause the apparatus at least to request a time from a scheduler.

4. The apparatus as claimed in claim 3, wherein said requested time comprises a time slot.

5. The apparatus as claimed in claim 3, wherein said scheduler comprises a radio protocol scheduler.

6. The apparatus as clamed in claim 3 operatively connected with a scheduler.

7. The apparatus as claimed in claim 1, wherein the at least one memory and the computer program code are configured to, with the at least one processor, cause the apparatus at least to set the trigger condition comprising at least one of time, temperature, an environmental condition, operating conditions, change in system parameters before or after a transmission or reception of a signal, configuration changes of at least one component, initialization of a new component, a predetermined power level, and configuration of at least one component for a different radio protocol.

8. The apparatus as claimed in claim 1, wherein the at least one memory and the computer program code are configured to, with the at least one processor, cause the apparatus at least to send configuration information to at least one trigger to define at least one trigger condition.

9. The apparatus as claimed in claim 8, wherein the at least one memory and the computer program code are configured to, with the at least one processor, cause the apparatus at least to receive from said at least one trigger, information indicating when a set trigger condition has occurred.

10. The apparatus as claimed in claim 8 operatively connected with at least one trigger.

11. The apparatus as claimed in claim 1, wherein the at least one memory and the computer program code are configured to, with the at least one processor, cause the apparatus at least to receive said calibration information from at least one hardware driver for said at least one component.

12. The apparatus as claimed in claim 11, wherein the at least one memory and the computer program code are configured to, with the at least one processor, cause the apparatus at least to send a request for said calibration information to said at least one hardware driver.

13. The apparatus as claimed in claim 12 operatively connected with said at least one hardware driver.

14. The apparatus as claimed in claim 13, wherein said at least one hardware driver is configured to control associated hardware.

15. The apparatus as claimed in claim 13, wherein said at least one hardware driver is configured to automatically provide said calibration information to said calibration manager.

16. The apparatus as claimed in claim 1, wherein said receiving unit, said setting unit, and said execution unit are configured to be at least partially implemented in software.

17. An integrated circuit, comprising:
a calibration manager, said calibration manager comprising
a receiving unit configured to receive information relating to a calibration of at least one component from the at least one component;
a setting unit configured to set a trigger condition for executing said calibration in dependence on said received information; and
an execution unit configured to execute said calibration in dependence on said trigger condition.

18. The integrated circuit as claimed in claim 17, further comprising:
a radio unit configured to provide a multiradio function.

19. The integrated circuit as claimed in claim 17, further comprising:
factory calibration software configured to communicate with said calibration manager.

20. A device, comprising:
an integrated circuit, said integrated circuit comprising
a calibration manager, said calibration manager, comprising
a receiving unit configured to receive information relating to a calibration of at least one component from the at least one component;
a setting unit configured to set a trigger condition for executing said calibration in dependence on said received information; and
an execution unit configured to execute said calibration in dependence on said trigger condition.

21. A calibration method, comprising;
receiving, using an integrated circuit, information relating to a calibration of at least one component from the at least one component;
setting, using the integrated circuit, a trigger condition for a calibration measurement in dependence on said received information; and
executing, using the integrated circuit, said calibration in dependence on said trigger condition.

22. The calibration method as claimed in claim 21, further comprising:
setting, using the integrated circuit, a time for executing said calibration.

23. A computer program product embodied on a computer readable storage medium, the computer program product being configured to control a processor to perform:
receiving information relating to the calibration of at least one component from the at least one component;
setting a trigger condition for a calibration measurement in dependence on said received information;
setting a time for executing said calibration; and
executing said calibration in dependence on said trigger condition.

24. A calibration manager, comprising;
receiving means for receiving information relating to a calibration of at least one component from the at least one component;
trigger means for setting a trigger condition for a calibration measurement, said trigger condition comprising at least one of: time, temperature, an environmental condition, operating conditions, change in system parameters before or after a transmission or reception of a signal, configuration changes of at least one component, initialization of a new component, a predetermined power level, and configuration of at least one component for a different radio protocol.

25. A calibration manager, comprising:
receiving means for receiving information relating to the calibration of at least one component from the at least one component;
trigger means for setting a trigger condition for executing a calibration in dependence on said received information; and
calibration means for executing said calibration in dependence on said trigger condition.

26. The calibration manager as claimed in claim 25, further comprising:
timer means for setting a time for said calibration.

27. The calibration manager of claim 26, wherein said time comprises regular time intervals.

* * * * *